Dec. 16, 1952  V. T. SIMMONS  2,621,398
DEVICE FOR AND METHOD OF INSTALLING AN OIL SEAL
Filed July 7, 1950
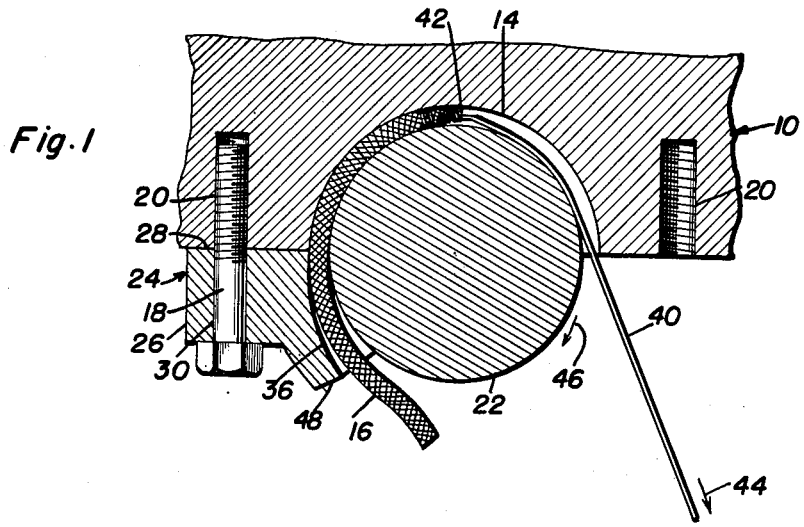
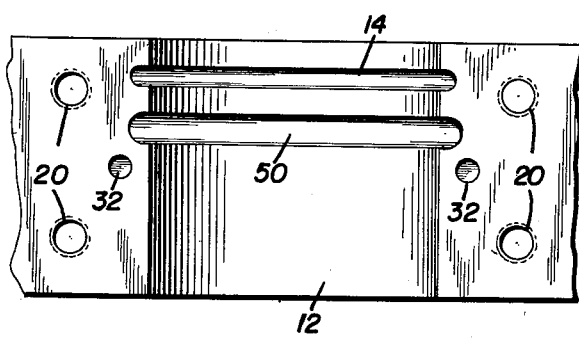
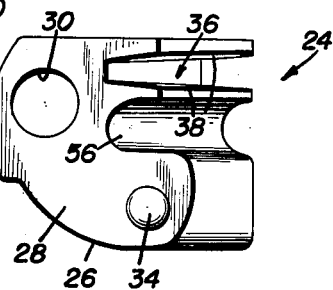
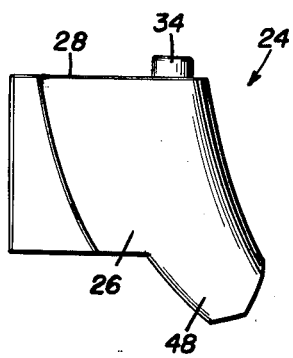
Virgil T. Simmons
INVENTOR.
BY *Clarence A. O'Brien*
*and Harvey B. Jacobson*
Attorneys Patented Dec. 16, 1952

2,621,398

UNITED STATES PATENT OFFICE 2,621,398

DEVICE FOR AND METHOD OF INSTALLING AN OIL SEAL

Virgil T. Simmons, Childress, Tex., assignor of one-fourth to Semoun H. Simmons, Childress, Tex.

Application July 7, 1950, Serial No. 172,597

2 Claims. (Cl. 29—148)

This invention relates to new and useful improvements and structural refinements in the art of installing oil seals in upper rear main bearings of internal combustion engines such as are used on automobiles, and the principal object of the invention is to provide a device and a method whereby the installation of such oil seals may be quickly, easily and conveniently effected.

The oil seal in the upper rear main bearing of an internal combustion engine is positioned in a narrow groove, and since the oil seal itself is in the form of a strand of graphite-impregnated packing which, prior to installation, exceeds the dimensions of the groove, considerable difficulty is usually experienced in "threading" the oil seal into position. Accordingly, the above object is carried out by the provision of a device which facilitates commencement or starting of the threading operation of the oil seal, the invention also involving a method whereby the oil seal, "started" by means of the device, may subsequently be easily drawn or "threaded" into position.

Some of the advantages of the invention reside in its simplicity of construction, in its efficient operation and in its adaptability for use on internal combustion engines of various types.

With the above more important objects and features in view and such other objects and features as may become apparent as this specification proceeds, the invention consists essentially of the arrangement and construction of parts as illustrated in the accompanying drawings, in which:

Figure 1 is a fragmentary sectional view of the rear main bearing portion of an internal combustion engine, illustrating the invention in use.

Figure 2 is a fragmentary underside plan view showing the conventional groove in the engine wherein the oil seal is installed.

Figure 3 is a top plan view of the invention per se, and

Figure 4 is an elevational view thereof.

Like characters of reference are employed to designate like parts in the specification and throughout the several views.

Referring now to the accompanying drawings in detail, the general reference character 10 designates the block of an internal combustion engine, provided with a semi-cylindrical seat 12 for the upper rear main bearing (not shown), and also provided with a semi-circular groove 14 for the reception of a conventional oil seal 16.

The lower half of the bearing or the bearing cap (also not shown) is secured in position to the block 10 by a plurality of cap screws, one of which is illustrated at 18, these cap screws being receivable in screw threaded bores 20 with which the block is provided.

The reference character 22 designates the crank shaft which, incidentally, is retained in its position while the replacement of the oil seal is effected, and the invention contemplates the provision of a device for installing the oil seal, this device being designated generally by the reference character 24.

The device 24 simply consists of a block 26 having a flat upper surface 28 which is adapted to abut the underside of the engine block 10, the block 26 being provided with a bore or aperture 30 to receive one of the aforementioned cap screws 18 whereby the block may be secured in position. It is to be noted in this connection that the engine block 10 is formed, usually, with suitable apertures 32 to accomodate dowels (not shown) on the bearing cap, and if desired, a dowel pin 34 may project upwardly from the upper surface 28 of the block 26 into one of the apertures 32 in the block 10, whereby rotation of the block 26 about the axis of the screw 18 is prevented.

In any event, the block 26 is formed with an arcuate groove 36 which is tapered or "funneled" in so far that the side walls 38 of the groove (see Figure 3) are divergent outwardly as well as downwardly from the upper surface 28, and the arrangement is such that when the block 26 is secured in position, the upper end of the groove 36 is in register with one end of the groove 14 in the block 10.

When in operation, a flexible element such as a wire 40 is tied as at 42 to one end of the oil seal 16 and is passed through the groove 36 in the block 26 and through the groove 14 in the block 10, whereupon by pulling the wire 40 in the direction of the arrow 44, the seal 16 will be drawn or "threaded" through the groove 36 into its proper position in the groove 14, this being effected without the necessity of removing the crankshaft 22. While the drawing or threading of the oil seal is being undertaken, the crank shaft 22 may be rotated in the direction of the arrow 46 so as to substantially assist the threading operation, and needless to say, after the threading of the oil seal is accomplished, the wire 40 may be untied from the latter.

It is to be noted, however, that by virtue of the "funneled" configuration of the groove 36, the relatively thick oil seal will be gradually compressed to its proper size as it is being drawn through the groove in the block 26 into the groove 14, this being achieved with ease and convenience.

To permit the funneled groove 36 to be as long as possible, the block 26 may be formed integrally with a protuberance 48, this arrangement permitting the main body portion of the block itself to remain comparatively small.

Since the engine block 10 is usually provided with a semi-circular groove 50 to accommodate an annular shoulder (not shown) on the crankshaft 22, a complemental, arcuate groove 56 may be provided in the block 26 adjacent the groove 36 to provide clearance for the crankshaft shoulder which, under the circumstances, does not interfere with proper positioning of the block.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in details of construction and arrangement of parts may be resorted to without departing from the spirit and scope of the invention as claimed.

Having described the invention, what is claimed as new is:

1. A method of installing an upper oil seal in the groove of the rear main bearing of an automotive engine, comprising the steps of removing the rear main bearing cap and the old seal from the engine, securing a guide block with a funneled groove to the engine in place of the removed bearing cap so that the groove in the guide block registers with the oil seal groove in the engine, tying a flexible element to one end of a new oil seal, passing said element through the oil seal groove in the engine, then pulling said element whereby to draw the new oil seal through the groove in the guide block into the groove in the engine, disconnecting said element from the new oil seal, removing the guide block from the engine and thereafter replacing said bearing cap.

2. A device for installing an oil seal in the upper rear main bearing groove of an automotive engine, said device comprising a guide block adapted to be secured to an engine and provided with a funneled oil seal receiving groove registerable with said rear main bearing groove in the engine, said block having an upper engine engaging surface, said funneled groove having walls divergent downwardly from said surface, and the upper end of said groove being substantially equal in width to the rear main bearing groove in the stated engine.

VIRGIL T. SIMMONS.

REFERENCES CITED

The following references are of record in the file of this patent:

UNITED STATES PATENTS

| Number | Name | Date |
| --- | --- | --- |
| 1,463,015 | Guay | July 24, 1923 |
| 1,830,814 | Thiry | Nov. 10, 1931 |
| 1,872,600 | Manning | Aug. 16, 1932 |
| 1,936,454 | Klocke | Nov. 21, 1933 |
| 2,347,912 | Komives | May 2, 1944 |
| 2,491,776 | Skelton | Dec. 20, 1949 |